United States Patent [19]

Hooker, Jr.

[11] 4,088,996
[45] May 9, 1978

[54] RADAR SIGNAL PROCESSOR

[75] Inventor: Marvin L. Hooker, Jr., Marion, Iowa

[73] Assignee: Rockwell International Corporation, El Segundo, Calif.

[21] Appl. No.: 720,165

[22] Filed: Sep. 2, 1976

[51] Int. Cl.² ............................ G01S 9/02; G01S 9/06
[52] U.S. Cl. ................................. 343/5 VQ; 343/5 W; 343/11 R
[58] Field of Search ............... 343/5 DP, 5 VQ, 5 W, 343/13 R, 11 R

[56] References Cited

U.S. PATENT DOCUMENTS

| | | | |
|---|---|---|---|
| 3,353,177 | 11/1967 | Wilmot | 343/5 VQ |
| 3,680,095 | 7/1972 | Evans | 343/5 VQ |
| 3,810,174 | 5/1974 | Heard et al. | 343/5 VQ |

FOREIGN PATENT DOCUMENTS

| | | | |
|---|---|---|---|
| 2,346,950 | 4/1974 | Germany | 343/5 VQ |

Primary Examiner—S. C. Buczinski
Attorney, Agent, or Firm—Terry M. Blackwood; Robert J. Crawford; L. Lee Humphries

[57] ABSTRACT

A postdetection, digital radar signal processor for producing information for a PPI type display on a conventional CRT. Each line of the polar or PPI type display represents a summing of past and present returns received at substantially the same antenna position during past and present antenna scans.

7 Claims, 9 Drawing Figures

RADAR SIGNAL PROCESSOR

This invention relates to electronics and more particularly to digital processors for use with radar systems.

Storage tubes, or electrostatic memory tubes, are widely used for radar indicators. The information painted thereon is retained by electric charges and thus such tubes can provide to the operator a continuous map of the system observed space. However, storage tubes are expensive, unstable, and have limited dynamic range. They also require critical adjustments.

Previous attempts to replace the storage tube in airborne weather radar applications with a conventional CRT (cathode ray tube) and digital memory have had some success and also some shortcomings. For instance, some prior art systems employ a running-average type of processing which results in 3° to 4° of target smearing and target shifting from scan to scan. This running-average type of processing also masks and distorts true storm gradients. Furthermore, point targets and long range targets are not always detected by such systems.

Figure 1:
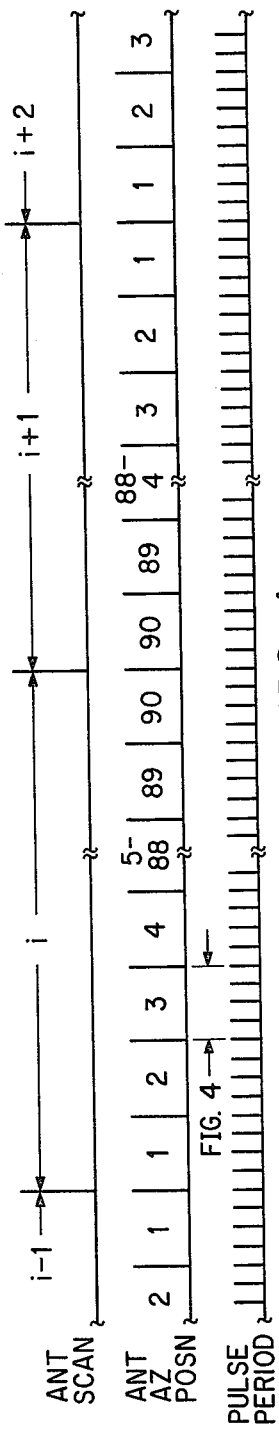
Figure 2:
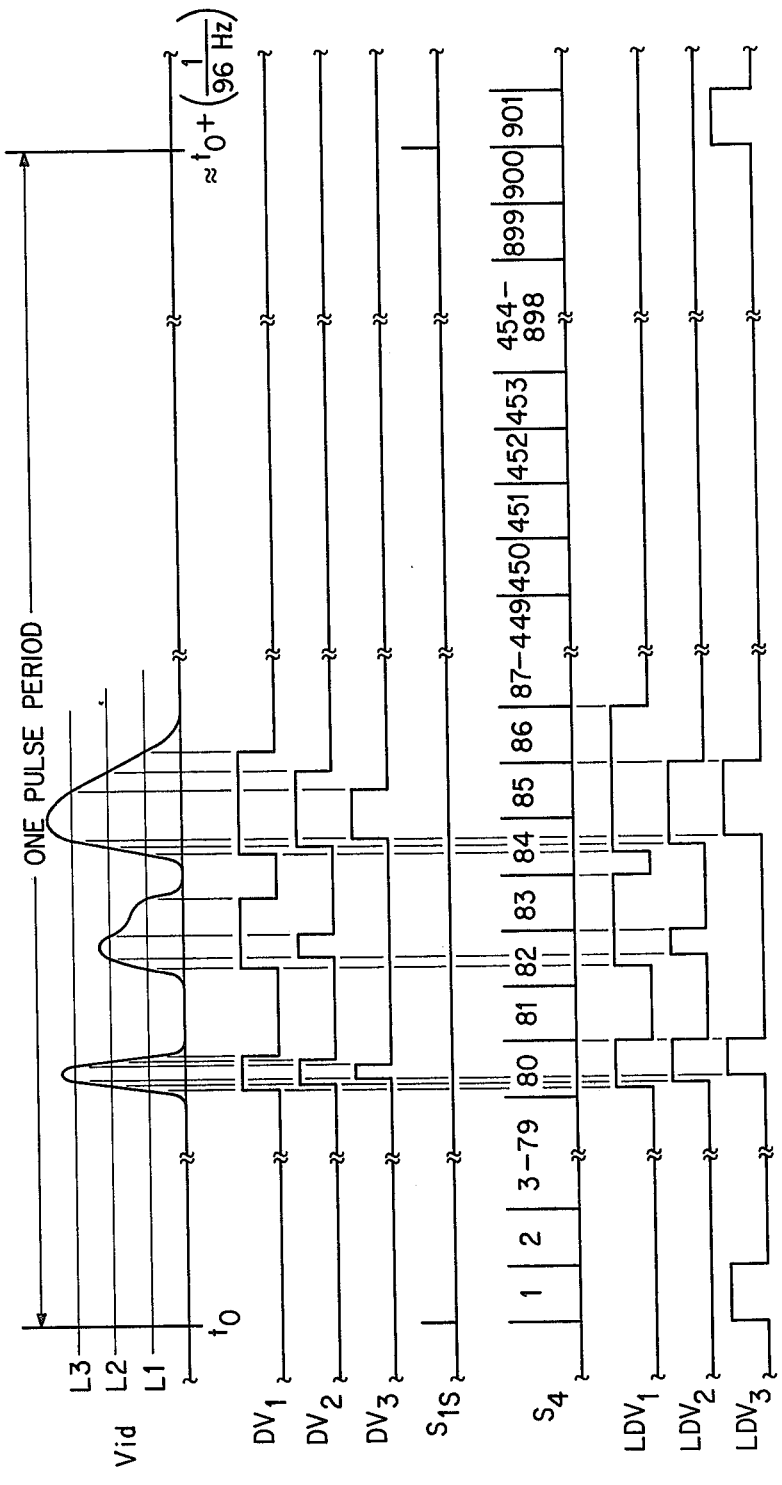
Figure 3:
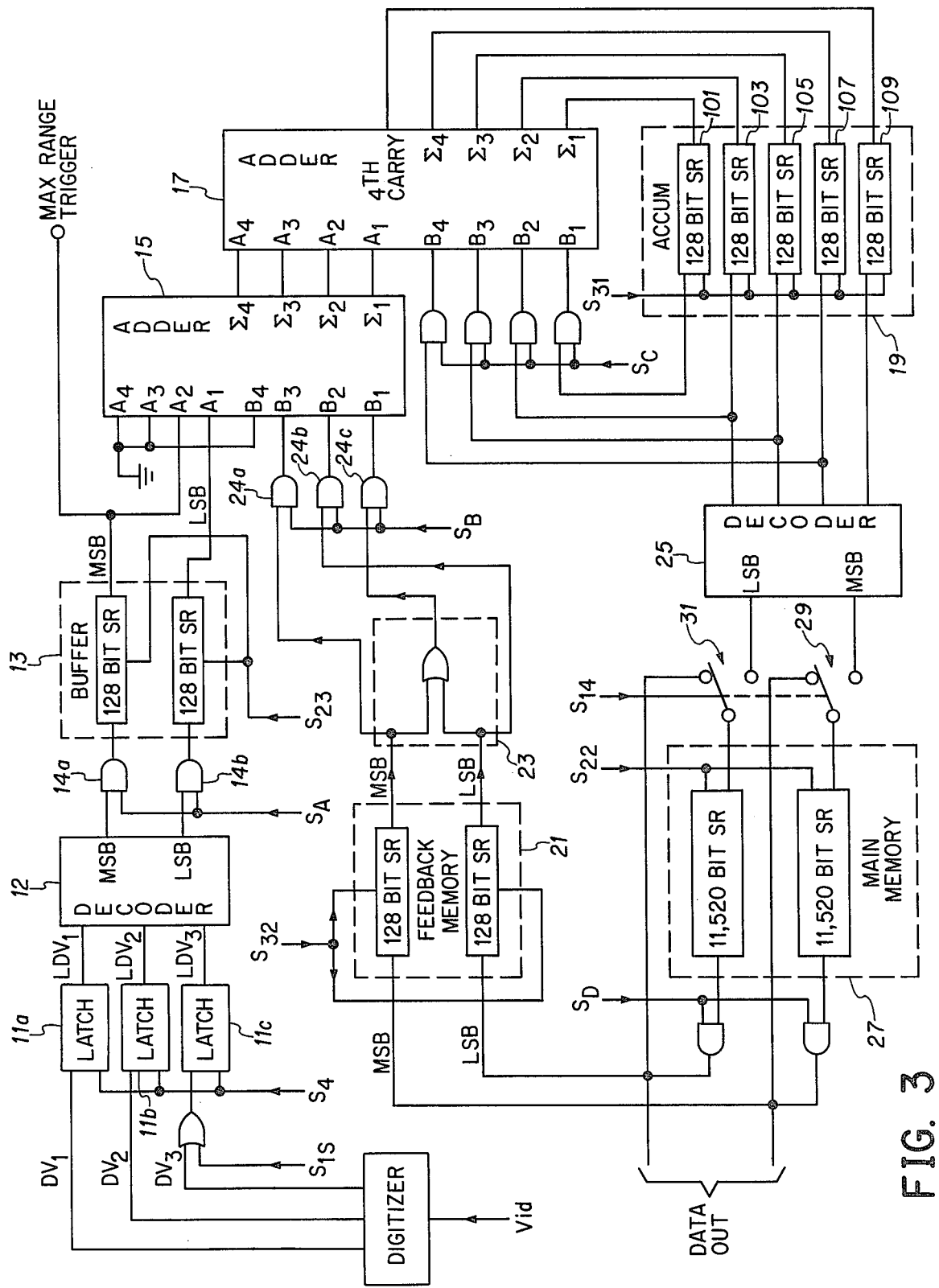
Figure 4:
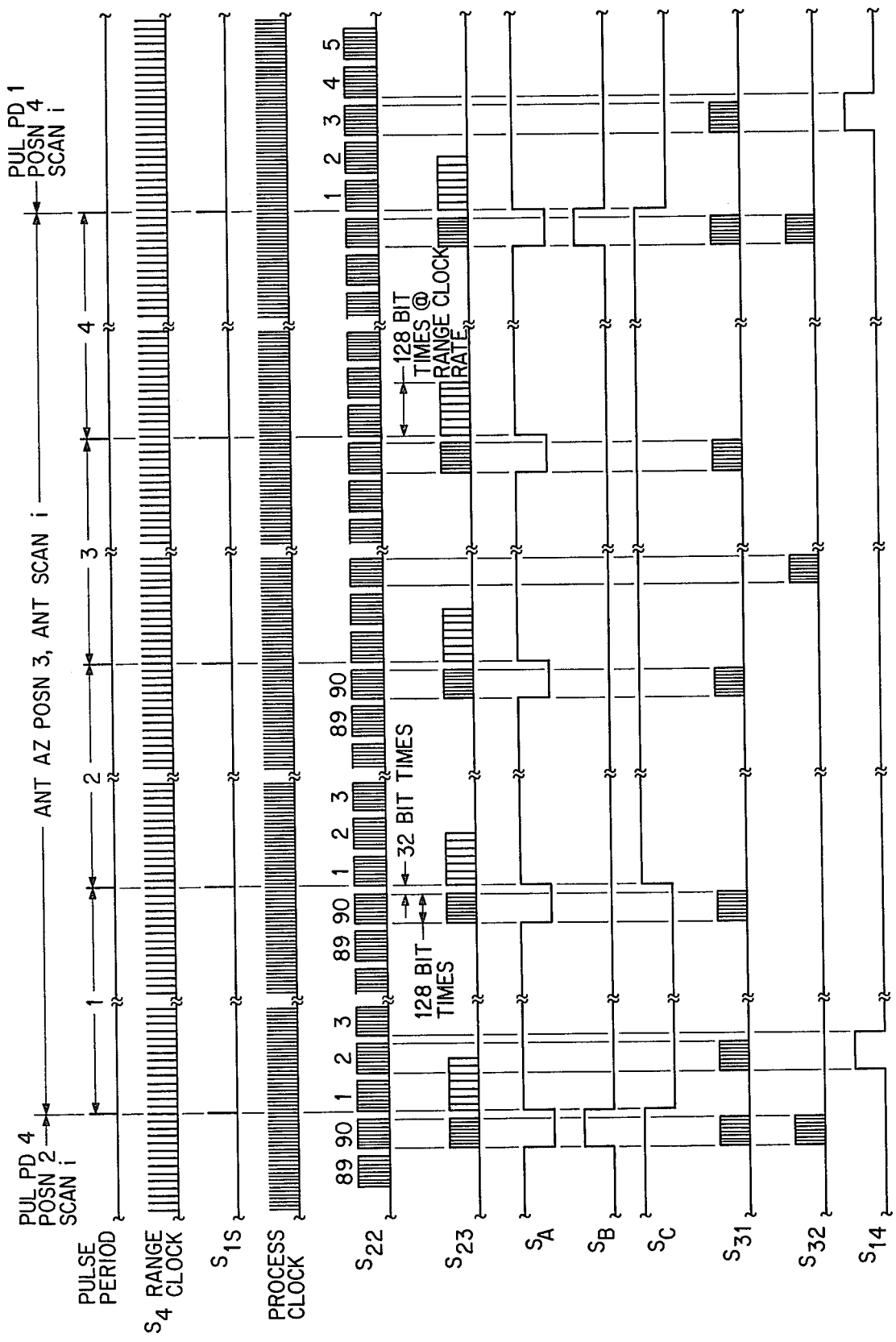
Figure 7:
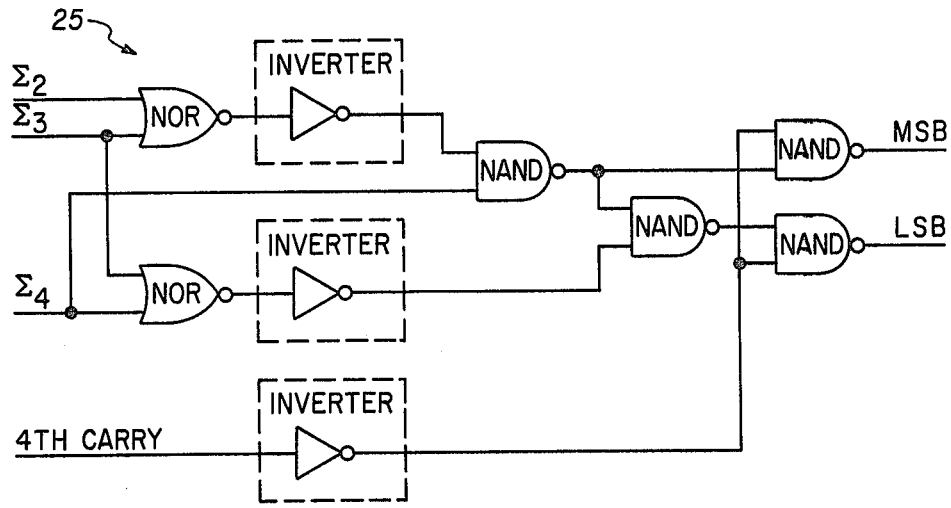
Figure 8:
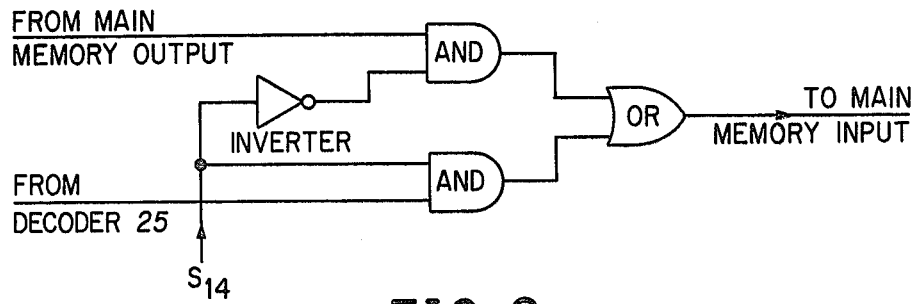
Figure 9:
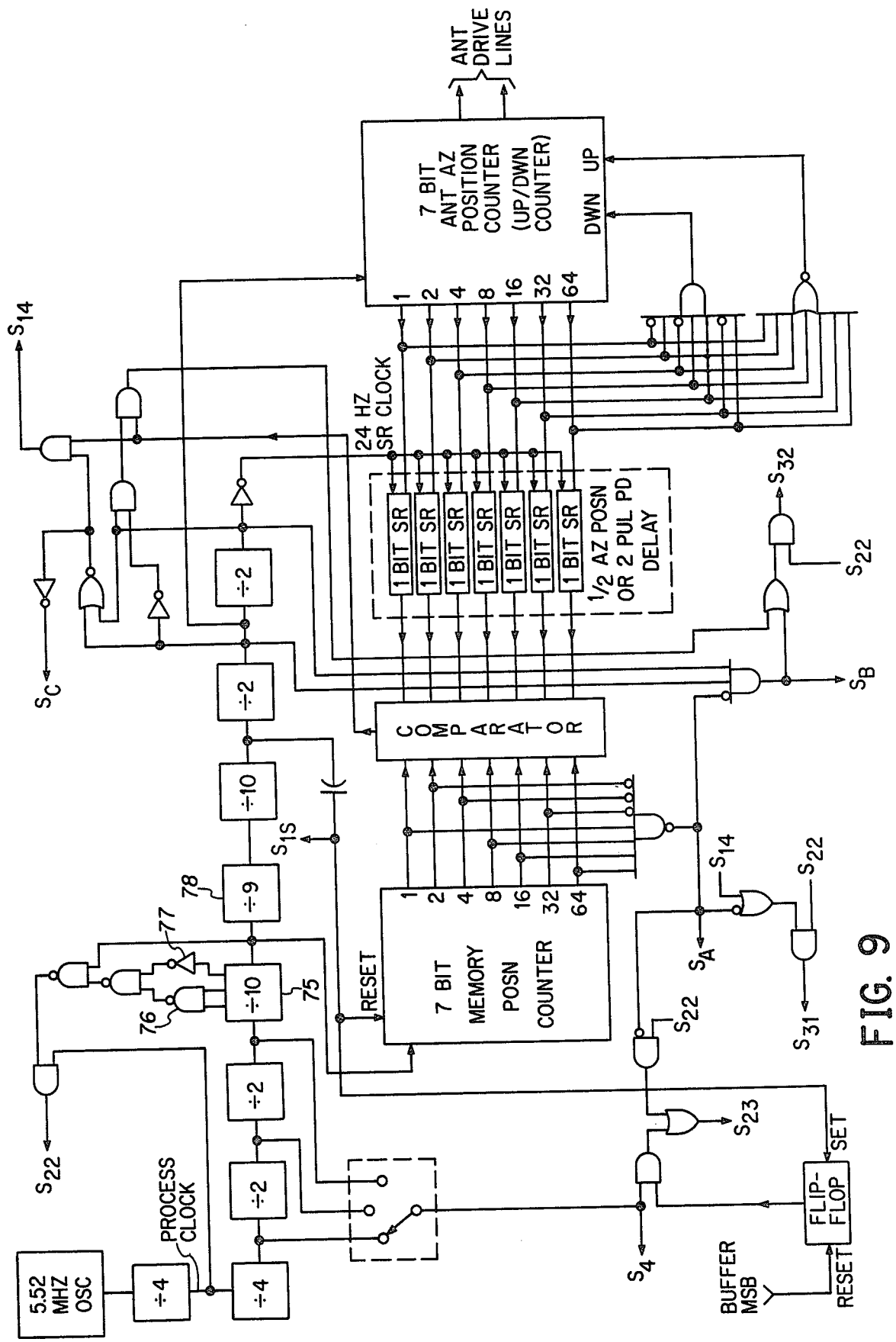

In accordance with the present invention, the running average type of processing and the resultant target smearing and shifting and gradient masking are eliminated. Also, in the presently preferred embodiment, provision is made whereby point targets and long range targets are not overlooked. These and other features, objects, and advantages of the invention will become more apparent upon reference to the following specification, claims, and appended drawings in which:

FIGS. 1, 2, and 4 show waveforms useful in explaining the system timing relationship and in explaining the operation of the FIG. 3 apparatus, FIG. 3 is a block functional diagram showing the presently preferred processor embodiment, FIGS. 5, 6, 7, and 8 are circuit diagrams showing certain portions of the FIG. 3 apparatus in more detail, and FIG. 9 is a circuit diagram showing a timing generator apparatus for producing the waveforms of FIG. 4.

The processor as presently employed constitutes part of a weather radar system which provides a polar display on a conventional CRT. The processor receives video from the RF and early postdetection stages of the radar system and provides digital data suitable, after digital to analog conversion, for modulating the CRT electron beam intensity (Z-axis) as the electron beam is made to sweep outward with range from the polar coordinates center. Herein, the terms line, line of display, line of information, or line of data, will be used to indicate the information displayed, or the data used in displaying, during one outward sweep with range of the CRT electron beam. Each line is oriented at a different polar angle, or azimuth position, and field, or field of display or information or data, will be used to mean the assemblage of such lines.

As will be described in more detail hereinbelow, each line of data is derived from radar returns from a particular azimuth position plus the next preceding line of data from this same azimuth position. More particularly, with the antenna oriented in a substantially fixed azimuth position P, four radar pulses, equally spaced in time, are transmitted, and the four return signals are added together, their sum contributing to the line of data for position P. In the preferred embodiment, the remaining and only other contributor to the line of data for this azimuth position P is the line of data derived during the next preceding antenna azimuth scan for the same azimuth position P. This earlier line of data, having been stored and retained in memory, is recalled, weighted in a predetermined manner and the result added to the first contributor, i.e., the sum of the four return signals. This overall sum is then processed by a decoder which provides threshold detection and the result is a new line of data for azimuth position P which is then stored in the memory in the correct location, thus replacing in memory the previous line of data for position P.

Turning now to FIG. 1, therein is shown a preferred coordination of antenna position and transmitter pulses. As shown, each antenna scan in azimuth comprises 90 different azimuth positions, and each azimuth position comprises 4 pulse periods. Presently, each scan covers 90° in 1° increments and the direction of successive scans alternates between clockwise and counterclockwise. During any one pulse period, a radar pulse is transmitted and the return therefrom is processed at RF and then amplitude detected. The resultant video signal is then digitized and the digitized video is applied to the processor. This is seen more clearly in FIG. 2 wherein one pulse period is shown and the signal Vid represents a typical return signal as it appears at video following an RF transmitter pulse occurring at $t_0$. In the preferred system, 4 ranges of amplitudes of the signal Vid are encoded into 3 digital signals $DV_1$, $DV_2$, and $DV_3$, which together represent the digitized form of Vid. For the time that Vid exceeds a particular threshold, a corresponding one of the digital signals becomes a "1"; otherwise said corresponding signal is a "0". The conversion from video to digitized video is more detailedly described in FIG. 2 and in Table 1 below:

TABLE 1

|  | $DV_1 =$ | $DV_2 =$ | $DV_3 =$ |
|---|---|---|---|
| when $Vid < L_1$ | 0 | 0 | 0 |
| when $L_1 < Vid < L_2$ | 1 | 0 | 0 |
| when $L_2 < Vid < L_3$ | 1 | 1 | 0 |
| when $L_3 < Vid$ | 1 | 1 | 1 |

In the present system the digitizer comprises three threshold detectors, each comprising a comparator circuit set to trigger at a different one of levels $L_1$, $L_2$, or $L_3$. Such means for digitizing video data are well known to those skilled in the art.

Turning now to FIG. 3, it is seen that the digital video signals $DV_1$, $DV_2$, and $DV_3$ are input respectively to latches 11a, 11b and 11c. Signal $S_4$, also an input signal to the latches, is a control signal and more particularly is a range clock signal which establishes the resolvable range intervals. Returning briefly to FIG. 2 the effect of latches 11a, 11b, and 11c on their respective digital input signals is therein shown. That is, for each latch, the output signal goes high when the input signal goes high. The output signal then remains high until the $S_4$ clock transition next following the input going low, at which clock transition said output signal goes low. Signals $DV_1$, $DV_2$, $DV_3$ are thus converted respectively into $LDV_1$, $LDV_2$, and $LDV_3$. (As will be described more fully hereinbelow, the frequency of $S_4$ is selectable, and in FIG. 2 the frequency used for illustrating $S_4$ is 86.25kHz.)

Latches 11a, 11b, and 11c are employed in the preferred embodiment because they provide a short term memory and store, until the end of a particular range interval, the largest signal received during that particular range interval. The received signal for that particular interval is not loaded into buffer memory 13 until the end of that particular interval and thus were it not for latches 11a, 11b, and 11c, point targets could go undetected and amplitudes could be misrepresented. For instance, the Vid pulse during interval 80 would go completely undetected. Also the Vid pulse during interval 82 would be erroneously interpreted because $DV_2$ returns low prior to the end of interval 82.

As will become more apparent hereinbelow, the purpose of signal $S_{1S}$ is to force signal $LDV_3$ high during the first range interval of each pulse period. This injected "1" eventually propogates to a flip-flop which it resets so as to establish the maximum radar range.

Continuing with FIG. 3, signals $LDV_1$, $LDV_2$, and $LDV_3$ are converted by decoder 12 to two parallel signals which contain the same information as the three input signals. Decoder 12 operates according to Table 2 below:

TABLE 2

| $LDV_1$ | $LDV_2$ | $LDV_3$ | Decoder Out | |
|---|---|---|---|---|
| | | | MSB | LSB |
| 0 | 0 | 0 | 0 | 0 |
| 1 | 0 | 0 | 0 | 1 |
| 1 | 1 | 0 | 1 | 0 |
| 1 | 1 | 1 | 1 | 1 |

The operation of the remainder of the FIG. 3 apparatus will first be briefly outlined.

Beginning immediately after each transmitted pulse, each of the shift registers of buffer memory 13 writes, at the range clock rate, 128 bits of information, When full, the buffer memory contains 128 two-parallel-bit words, each word in absolute binary code and representing the return signal for a particular range or time interval. Near the end of each pulse period, these 128 two-parallel-bit words are clocked out of buffer memory 13 (at a higher rate than they were clocked in) and into adders 15 and 17. Simultaneously near the end of each pulse period, 128 words in accumulator 19 are clocked into adder 17, and the buffer words and the accumulator words are added and the sum stored in accumulator 19. Simultaneously near the end of the fourth pulse period of a particular azimuth position, 128 words in feedback memory 21 are clocked through decoder 23 and, in decoded form, into adders 15 and 17, and the simultaneously occurring buffer words, accumulator words, and decoded feedback memory words are added and the sum stored in accumulator 19. Thus at the end of the fourth pulse period of a particular azimuth position, accumulator 19 contains 128 five-parallel-bit words which are the sum of (i) four bundles of 128 two-parallel-bit words from the buffer memory 13 and (ii) one bundle of 128 decoded two-parallel-bit words from the feedback memory 21. Each of the four bundles in buffer memory 13 of course represents a complete return signal over the entire range. The signal bundle of 128 words in feedback memory 21 represents the line of data produced and stored for the present azimuth position during the next preceding antenna scan.

The 128 five-parallel-bit words in accumulator 19 at the end of said fourth pulse period are each converted by decoder 25 into two-parallel-bit words according to Table 3. Decimal equivalents of the input and output words are shown in parentheses. The least significant bit of each word is not required for the code chosen and thus shift register 101 output is not fed to the decoder. This resulting bundle of 128 two-parallel-bit words is loaded at the appropriate memory location into main memory 27, replacing a similar bundle of 128 two-parallel-bit words at the same memory location.

TABLE 3

| | Accumulator Out | | | | | Decoder Out | | |
|---|---|---|---|---|---|---|---|---|
| (Dec. Eq.) | SR101 | SR103 | SR105 | SR107 | SR109 | MSB | LSB | (Dec. Eq.) |
| (0) | 0 | 0 | 0 | 0 | 0 | 0 | 0 | (0) |
| (1) | 1 | 0 | 0 | 0 | 0 | 0 | 0 | (0) |
| (2) | 0 | 1 | 0 | 0 | 0 | 0 | 0 | (0) |
| (3) | 1 | 1 | 0 | 0 | 0 | 0 | 0 | (0) |
| (4) | 0 | 0 | 1 | 0 | 0 | 0 | 1 | (1) |
| (5) | 1 | 0 | 1 | 0 | 0 | 0 | 1 | (1) |
| (6) | 0 | 1 | 1 | 0 | 0 | 0 | 1 | (1) |
| (7) | 1 | 1 | 1 | 0 | 0 | 0 | 1 | (1) |
| (8) | 0 | 0 | 0 | 1 | 0 | 0 | 1 | (1) |
| (9) | 1 | 0 | 0 | 1 | 0 | 0 | 1 | (1) |
| (10) | 0 | 1 | 0 | 1 | 0 | 1 | 0 | (2) |
| (11) | 1 | 1 | 0 | 1 | 0 | 1 | 0 | (2) |
| (12) | 0 | 0 | 1 | 1 | 0 | 1 | 0 | (2) |
| (13) | 1 | 0 | 1 | 1 | 0 | 1 | 0 | (2) |
| (14) | 0 | 1 | 1 | 1 | 0 | 1 | 0 | (2) |
| (15) | 1 | 1 | 1 | 1 | 0 | 1 | 0 | (2) |
| (16 & up) | 1 or 0 | 1 or 0 | 1 or 0 | 1 or 0 | 1 | 1 | 1 | (3) |

Main memory 27, which comprises two 11,520 bit static shift registers, stores 90 groups of data, each data group comprising a bundle of 128 two-parallel-bit words, and each one of the 90 data groups constituting one line of data. The shift registers are clocked so that all 90 lines of data (i.e., 11,520 two-parallel-bit words) are recirculated once every pulse period. The data in accumulator 19 for, say, azimuth position m, which is available only until the end of the first pulse period of azimuth position $(m+1)$, is clocked out of accumulator 19, through decoder 25 and, in decoded form, into the main memory 27 at the appropriate line time of the first pulse period of azimuth position $(m+1)$. That is, at the appropriate line time, $S_{31}$ comprises 128 clock transitions and $S_{14}$ activates swtiches 29 and 31, causing the shift registers of main memory 27 to write.

The single bundle of 128 feedback memory words which contributes to a new line of data for a particular azimuth position m is written into feedback memory 21 during the third pulse period of azimuth position m. As above stated, the 90 lines of data are recirculated once in the main memory during each pulse period and thus at the appropriate line time of the third pulse period of azimuth position $m$, $S_{32}$ clocks into the feedback memory 21 the appropriate one of the 90 data lines in main memory 27.

In now describing the FIG. 3 apparatus and its operation in more detail, attention is simultaneously directed to aiding FIG. 4 which shows certain timing relationships and waveforms of the FIG. 3 apparatus in and around the third azimuth position of the i th antenna scan in FIG. 1. During each antenna azimuth position there are four transmitter pulses occurring at a presently preferred repetition rate of approximately 96Hz. $S_4$ is a continuous clock signal whose frequency determines the length of the individual range intervals. $S_4$ clock transitions in the present system occur at a selectable one of three frequencies, namely, 345kHz, 172.5kHz, or 86.25kHz.

The process clock signal is a continuous clock signal whose frequency is 1.38MHz and which sets the rate at which data bits, once loaded into buffer memory 13, are processed. $S_{22}$ is a gated process clock and comprises, per pulse period, 90 bundles of 128 bit times at the process clock rate. Between each of the 90 bundles $S_{22}$ remains low for a time equivalent to 32 bit times at the process clock rate. In the preferred system, all 90 different lines of data are painted on the CRT every pulse period and the 32 bits "down" time between lines affords sufficient time for CRT sweep recovery.

$S_{23}$ is a gated clock signal which causes the shift registers of buffer memory 13 to write at one rate and read at another. More particularly, $S_{23}$ comprises, per pulse period, (i) a first bundle of 128 bit times at the range clock rate, this first bundle beginning immediately at the start of the pulse period, and (ii) a second bundle of 128 process clock bit times, this second bundle beginning 160 process clock bit times prior to the end of the pulse period.

It should be noted that 128 range clock bit times encompass either 4, 8, or 16 times as much total time or length as 128 process clock bit times, and thus the FIG. 4 illustration of this length relationship should not be considered even approximately to scale.

As described earlier, $S_{1S}$ causes the decoder 12 most significant bit to be a "1" during the first bit time of the 128 range clock bit times. This "1", after 128 bit times ripples down to the output, resets a flip-flop (not shown in FIG. 3) which in turn makes $S_{23}$ go low at the end of 128 bit times. This action also establishes the maximum range because when $S_{23}$ goes low, no more return signal data is loaded into the processor. The maximum range is thus equal to 128 bit times of range clock, and since the range clock frequency is either 345kHz, 172.5kHz, or 86.25kHz, the selectable maximum radar ranges in nautical miles are, respectively, 30, 60, and 120.

$S_A$ is a gate which assures that all buffer memory bits are zeros at the beginning of any one pulse period. That is, at the same time $S_{23}$ is clocking out the 128 buffer memory words at the end of a pulse period, $S_{23}$ is clocking all zeros into buffer memory 13 because during this time $S_A$ is low and thus both outputs of AND gates 14a and 14b L are low.

$S_{32}$ is a gated process clock which causes the feedback memory to write the 128 feedback words from the correct location of the main memory and which later, just prior to the end of a particular azimuth position, causes the feedback memory 21 to deliver or read these 128 feedback words out of feedback memory into the components which compute the new data line. More particularly, $S_{32}$ comprises a first bundle of 128 process clock bit times occurring at a predetermined but variable time during the third pulse period, and a second bundle of 128 process clock bit times occurring at a predetermined and fixed time during the fourth pulse period. For the FIG. 4 condition where the antenna is assumed to be in antenna azimuth position No. 3, said first $S_{32}$ bundle is caused to occur at the time that the previous data line for azimuth position No. 3 is available at the output of main memory 27; i.e., at the third line time of main memory 27. Thus, the correct data line for the present azimuth position is loaded into feedback memory 21. Said second $S_{32}$ bundle is caused to occur simultaneously with the fourth occurrence in each azimuth position of the 128 process clock bit times of $S_{23}$; i.e., the fourth occurrence of the above described second bundle of $S_{23}$. $S_B$ is a gate signal which controls AND gates 24a, 24b, and 24c, and assures that, except during said second $S_{32}$ group, only zeros are presented at the $B_1$, $B_2$, and $B_3$ inputs to adder 15.

$S_{31}$ is a gated process clock signal which, per azimuth position, comprises four bundles of 128 process clock bit times, each of which occurs at a predetermined and fixed time near the end of its respective pulse period, and a fifth bundle of 128 process clock bit times occurring at a predetermined but variable time only during the first pulse period of a particular azimuth position. The bundles which occur near the end of each pulse period always occur simultaneously with the 128 process clock bit times of $S_{23}$. The fifth bundle which occurs during the first pulse period of each azimuth position, occurs at the main memory line time corresponding to the next preceding azimuth position. In FIG. 4 which illustrates azimuth position No. 3, this fifth bundle of $S_{31}$ occurring during the first pulse period is also seen to occur during the second line time of main memory 27. The new line of data for the next preceding azimuth position i.e., azimuth position No. 2, was not available until the end of azimuth position No. 2, and thus this fifth $S_{31}$ bundle loads, during azimuth position No. 3, the new line of data for azimuth position No. 2 into main memory 27 at the line No. 2 location. The four bundles occurring simultaneously with the $S_{23}$ process clock bit times cause the accumulator to accumulate the buffer and feedback memory contributions to the new line of data for azimuth position No. 3. The new line of data for azimuth position No. 3 is then loaded into main memory 27 during the first pulse period of azimuth position No. 4 and more particularly during the third main memory line time thereof.

$S_C$ is a gating signal which prevents accumulator 19 from continuing to accumulate beyond the end of any particular azimuth position. That is, during the first pulse period when the next preceding data line is being clocked from accumulator 19 through decoder 25 and, in decoded form, into main memory 27, the $B_1$ through $B_4$ inputs to adder 17 are all impressed with zeros regardless which data line is being loaded. The $A_1$ through the $A_4$ inputs of adder 17, during the first pulse period, are either all impressed with zeros or are impressed with new data from the first return signal. In either case, accumulator 19 is completely refreshed.

$S_{14}$ is a gating signal which operates switches 29 and 31 at the appropriate time and allows the main memory to write the new data line being read from the accumulator 19 via decoder 25.

$S_D$, not shown in FIG. 4, is a gating signal which is held low for about 20 milliseconds after the system is first turned on and is otherwise high. The function of $S_D$ is to completely clear the main memory on system start-up.

As may be deduced from FIG. 3, decoder 23 operates according to Table 4 below.

TABLE 4

| Decoder 23 In | | Decoder 23 Out | | |
|---|---|---|---|---|
| MSB | LSB | To $B_1$ of 15 | To $B_2$ of 15 | To $B_3$ of 15 |
| 0 | 0 | 0 | 0 | 0 |
| 0 | 1 | 1 | 1 | 0 |
| 1 | 0 | 1 | 0 | 1 |
| 1 | 1 | 1 | 1 | 1 |

The operation of decoder 25 has already been shown in Table 3 hereinabove. As seen from Table 3, decoder 25 serves as a multi-level threshold detector. That is, decoder 25 outputs a particular value or level only when the input value is within the appropriate range of values. Decoder 23 provides a hysteretic effect and prevents the value or level of any new word in main memory 27 from changing excessively with respect to the value of the main memory word which the new word replaces. That is, and as will be more fully described below, for the value of any word in the main memory to change over its complete range of possible values, more than one antenna scan is required.

Moreover, the choices for decoders 23 and 25 were made in accordance with traditional principles of probability of detection. As known by those skilled in the analog video processor art, a trade-off must always be made between probability of detection and probability of a false alarm, false alarm being defined as a noise pulse that is mistaken for a valid target. However, the essentially infinite storage time of a digital memory makes more than a few false alarm returns extremely objectionable. Therefore, for the present processor, the threshold detection criteria is weighted slightly more than optimal toward the lower probability of a false alarm. More particularly the detection criteria employed, assuming a "0" is in the main memory, requires at least four first-level return signals in a row before a first level (i.e., a "1") is entered into the main memory. This may be seen from Table 3 and Table 4 hereinabove. This is in contrast to the optimal detection ratio of three out of four. After a "1" has been entered in memory only one first level return signal is required for the "1" to remain in the main memory. This is because, as seen from Table 4 above, the feedback path routes a binary number to the adder 15 equal to $2N+1$ for $N=1$ through 3, and 0 for $N=0$, where N is the decimal equivalent of the value of the feedback word; i.e., the decimal equivalent, of the binary number stored in the main memory and fed back.

The optimal detection criteria is used for the higher level signals. After a first level (i.e., a "1") is in the memory, three out of four second-level signals plus one first-level signal are required to enter a "2" into memory. After a "2" is in memory only one second level return out of four plus three first-level signals are required for the "2" to remain in memory. In a similar fashion three third-level signals plus one second-level signal will advance the memory from a "2" to a "3", and one third-level signal plus three second-level signals will hold a "3" in memory. As may be seen from Tables 3 and 4, when the input for a particular position makes a transition from one value to another where the difference in input value is "2" or greater, more than one antenna scan is always required before the corresponding main memory word makes the full corresponding transition. Typically, a memory word is not likely to change more than one level per antenna scan. This effectively lengthens the integration time constant of the processor thus producing a more stable display without increasing the size of the memory, transmitter pulse repetition rate, or antenna scan rate.

Figure 5:
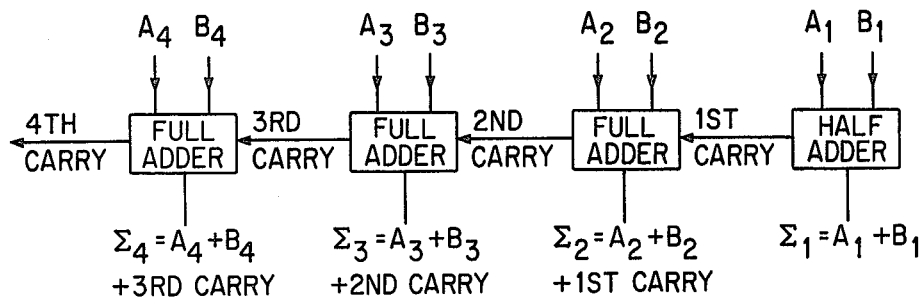
Figure 6:
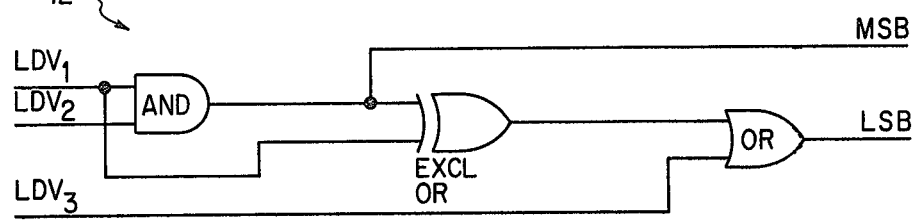

Adders 15 and 17 are each a parallel four-bit binary adder as illustrated in FIG. 5. Decoders 12 and 25 each comprise an appropriate combination of gates and/or inverters and are illustrated in FIG. 6 and 7 respectively. Switches 29 and 31 each comprise an AND-OR gate as illustrated in FIG. 8. Each of latches 11a, 11b and 11c comprises a pair of cross-coupled NAND gates. The two free inputs, one on each gate, are respectively impressed with $S_4$ and the appropriate DV signal.

FIG. 9 represents timing generator apparatus for generating the signals of FIG. 4. The comparator illustrated as receiving the outputs of the two 7-bit counters, outputs a pulse for the time duration that the counts in the two counters are equal. One comparator embodiment comprises seven EXCLUSIVE-OR gates, the first gate receiving at separate inputs the first bit of both counters, the second gate receiving at separate inputs the second bit of both counters, and so on. The outputs of all seven gates are then NOR'ed to provide the single comparator output. The range clock selector is illustrated as a three position switch which allows the range clock frequency to be selected as (5.52/16)MHz, (5.52/32)MHz, or (5.52/64)MHz. In practice, the switch is implemented as three AND gates whose outputs are OR'ed, the appropriate AND gate receiving an enable signal from a remote selecting location. The divide-by-10 circuit 75 presently comprises a 7490 counter available from several manufacturers including Fairchild, Texas Instruments, and Motorola. The $Q_B$ and $Q_C$ outputs of divider 75 are connected to NAND gate 76, the $Q_D$ output is connected to inverter 77, and the $Q_A$ output is connected to the divide-by-9 circuit 78. The up-down counter establishes the 90 antenna azimuth positions per antenna scan. Assuming the up-down counter starts with an output of "0" it is directed to count up until it outputs the number "90". "90" is only outputted momentarily. The counter is then directed to count down until it outputs the number of "0". And so on.

The remaining various components of FIG. 9, as illustrated, are familiar and well known to those skilled in the art. Thus, especially in view of the FIG. 4 waveforms and the descriptions hereinabove, FIG. 9 operation is deemed self-explanatory without further explanation.

As earilier mentioned, the information in the main memory is applied to a digital to analog converter and then used to intensity modulate a CRT electron beam. The X—Y or R-$\theta$ beam deflection waveforms should of course be time coordinated with the main memory data lines in order to obtain an intelligible display. The presently preferred method of picture generation is to generate or paint the information on the CRT as it becomes available at the main memory output. This results in the generating, per pulse period, of one complete picture of the entire field (i.e., all 90 lines) of main memory data. It has also been found advantageous to paint half of the pictures on the CRT in their accurate location and to paint the other half with an artificial shift in $\theta$ of about 0.5° so as to fill in the display. That is, data lines 1–90, during pulse period No. 1, are painted on the CRT in the positions corresponding to their particular azimuth position. During pulse period No. 2, lines 1–90 are each painted again but this time so that line 1 is now displayed approximately midway between the previous painting of lines 1 and 2, line 2 is now displayed approximately midway between the previous painting of lines 2 and 3, and so on. The picture painted for pulse period No. 3 is identical to that for pulse period No. 1, and the picture painted for pulse period No. 4 is identical to that for pulse period No. 2. In the present system, lines 1–90 are each delayed ½ line (by a shift register) during the odd numbered pulse periods in order to coordinate with the corresponding delay in the CRT deflection system.

It should also be noted that in the preferred system the first eight words of each line are blanked out of the display. This prevents excessive brightness on the CRT at the polar center and eliminates from the display data too crowded to be usable. Also since the first eight words are blanked, the artificial "1" injected to set the maximum range is never displayed.

In the present system the antenna drive signals are derived from the apparatus for FIG. 9 such that the antenna is stepped in ¼° increments at the pulse period rate, i.e., approximately 96Hz. Thus the antenna is always within ±⅛° of a fixed antenna azimuth position during each data acquisition/integration time of four pulse periods. For purposes of data acquisition and processing it is preferable for the antenna to remain absolutely fixed over the four pulse periods and to then be stepped in one degree increments, but ¼° increments are used as a compromise to reduce motor and gear loading and to provide smoother stepping action. In addition it has been determined that the differences in displayed data created by said compromise are inperceptible. This is believed due to the fact that the antenna beam width, which is about 6° to 8°, is substantially larger than the antenna azimuth position variation of ±⅛°. Thus even though the antenna in the present system is not absolutely fixed during each of 90 azimuth positions, it is effectively or substantially fixed for each of the 90 azimuth positions. Moreover, even though ¼° stepping increments are presently used, the smearing caused by the aforementioned running-average type of processing is eliminated because in the present system only the same ¼° increments ever contribute to any given line of data. The only consequence of the ¼° stepping is to effectively widen the antenna beamwidth by approximately 1° from 6°–8° to 7°–9°.

It should further be noted that while a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. In a radar system of the type which has an antenna which repetitively scans through M successive and substantially fixed antenna positions, produces at each said position during any one scan a predetermined number N of serially occurring RF energy transmissions, and converts the received RF signals into video signals, improved digital means for processing said video signals and comprising:

first means for converting a video signal into a digital format comprising a series of digital words, each word representing the video signal over an associated one of adjacent range intervals, said first means including resettable latching means for preserving at the first means output, until the end of the associated range interval, the digital word representing the largest video signal amplitude occurring during said associated range interval regardless of where during said range interval said largest amplitude occurs, digital memory second means for retaining M groups of digitally formatted data, each data group being representative of previous reception from only a corresponding one of said M successive positions, digital summing third means, and fourth means, including timing control means, for (a) effecting the summing by said third means of (i) all N digitally formatted video signals occurring at a particular antenna position P during the most recent scan and (ii) data representative of the data group retained in said second means corresponding to antenna position P, and (b) causing a data group representative of the output sum of said third means to be entered into said second means at the location corresponding to antenna position P, thereby updating said second means by replacing a previous data group with a new data group, and (c) repeating said (a) and (b) for each of the other ones of the M positions.

2. In a radar system of the type which has an antenna which repetitively scans through N successive and substantially fixed antenna positions, produces at each said position during any one scan a predetermined number N of serially occurring RF energy transmissions, and converts the received RF signals into video signals, improved digital means for processing said video signals and comprising:

first means for converting a video signal into digital format, digital memory second means for retaining M groups of digitally formatted data, each data group being representative of previous reception from only a corresponding one of said M successive positions, digital summing third means, and fourth means, including timing control means, for (a) effecting the summing by said third means of (i) all N digitally formatted video signals occurring at a particular antenna position P during the most recent scan and (ii) data representative of the data group retained in said second means corresponding to antenna position P, and (b) causing a data group representative of the output sum of said third means to be entered into said second means at the location corresponding to antenna position P, thereby updating said second means by replacing a previous data group with a new data group, and (c) repeating said (a) and (b) for each of the other ones of the M positions, said digitally formatted signal comprising a predetermined number of digital words, each word representing the signal over a predetermined interval of time and containing a predetermined number of bits, each said data group comprising a predetermined number of digitial words, each data group word containing enough bits to define a predetermined number X of different levels of data, each said sum comprising a predetermined number of digital words, each said sum word comprising the sum of one data group word and N signal words, and said fourth means including decoder fifth means and decoder sixth means, said fifth means being located at digital memory second means for retaining M groups of digitally formatted data, each data group being representative of previous reception from only a corresponding one of said M successive positions, digital summing third means, and fourth means, including timing control means, for (a) effecting the summing by said third means of (i) all N digitally formatted video signals occurring at a particular antenna position P during the most recent scan and (ii) data representative of the data group retained in said second means corresponding to antenna position P, and (b) causing a data group representative of the output sum of said third means to be entered into said second means at the location corresponding to antenna position P, thereby updating said second means by replacing a previous data group with a new data group, and (c) repeating said (a) and (b) for each of the other ones of the M positions, said digitally formatted signal comprising a predetermined number of digital words, each word representing the signal over a predetermined interval of time and containing a predetermined number of bits, each said data group comprising a predetermined number of digital words, each data group word containing enough bits to define a predetermined number X of different levels of data, each said sum comprising a predetermined number of digital words, each said sum word comprising the sum of one data group word and N signal words, and said fourth means including decoder fifth means and decoder sixth means, said fifth means being located at the input to said second means, said sixth means being located at an input to said third means, said fifth means decoding each sum word into a data group word and serving as threshold detection means, outputting a particular one of said X data levels only for a particular range of values of the input sum word, at least one lower value data level being weighted more heavily than optimal toward low false alarm probability, said sixth means decoding previous data group words and providing contribution to each sum word, and thus to each new data group word, such that more than one antenna scan is required before any data group word can change through more than a few of the X possible data levels.

3. For use in a radar system having an antenna repetitively scanning through M number of successive, substantially fixed antenna positions and illuminating targets and receiving return therefrom, a postdetection processor for producing data for display on a CRT and comprising:

first means for producing a data group representative of return received from one of said M substantially fixed positions, said first means including means for converting a video signal into a series of digital words each representing the video signal over a different and associated one of adjacent range intervals, said conversion means including means for ensuring, should the video amplitude exceed a predetermined amplitude at any time during a given range interval, that a digital indication of video signal presence is provided by said conversion means at the end of said given range interval, second means, including memory means, for storing said data group, said memory means being capable of retaining in memory M data groups which correspond respectively to the M successive antenna positions, said first means including summing means, and means causing to be introduced at said summing means for summing (a) data representative of return received during an antenna scan I from a Jth one of said M positions and (b) data representative of the data group in said memory means which was produced previously during the preceding scan (I-1) and which corresponds to said Jth antenna position, said causing means causing similar summing for each of the other antenna positions.

4. In a radar system of the type which has an antenna which repetitively scans through M successive and substantially fixed antenna positions, produces at each said position during any one scan a predetermined number N of serially occurring RF energy transmissions, and converts the received RF signals into video signals, improved digital means for processing said video signals and comprising:

first means for converting a video signal into digital format, digital memory second means for retaining M groups of digitally formatted data, each data group being representative of previous reception from only a corresponding one of said M successive positions, digitial summing third means, and fourth means, including timing control means, for (a) effecting the summing by said third means of (i) all N digitally formatted video signals occurring at a particular antenna position P during the most recent scan and (ii) data representative of the data group retained in said second means corresponding to antenna position P, and (b) causing a data group representative of the output sum of said third means to be entered into said second means at the location corresponding to antenna position P, thereby updating said second means by replacing a previous data group with a new data group, and (c) repeating said (a) and (b) for each of the other ones of the M positions, said digitally formatted signal comprising a predetermined number of digital words, each word representing the signal over a predetermined interval of time and containing a predetermined number of bits, each said data group comprising a predetermined number of digitial words, each data group word containing enough bits to define a predetermined number X of different levels of data, each said sum comprising a predetermined number of digital words, each said sum word comprising the sum of one data group word and N signal words, and said fourth means including decoder means, located at the input to said second means, for decoding each sum word into a data group word and serving as threshold detection means, outputting a particular one of said X data levels only for a particular range of values of the input sum word, at least one lower value data level being weighted more heavily than optimal toward low false alarm probability.

5. In a radar system of the type which has an antenna which repetitively scans through M successive and substantially fixed antenna positions, produces at each said position during any one scan a predetermined number N of serially occurring RF energy transmissions, and converts the received RF signals into video signals, improved digital means for processing said video signals and comprising:

first means for converting a video signal into digital format, digital memory second means for retaining M groups of digitally formatted data, each data group being representative of previous reception from only a corresponding one of said M successive positions, digital summing third means, and fourth means, including timing control means, for (a) effecting the summing by said third means of (i) all N digitally formatted video signals occurring at a particular antenna position P during the most recent scan and (ii) data representative of the data group retained in said second means corresponding to antenna position P, and (b) causing a data group representative of the output sum of said third means to be entered into said second means at the location corresponding to antenna position P, thereby updating said second means by replacing a previous data group with a new data group, and (c) repeating said (a) and (b) for each of the other ones of the M positions, said digitally formatted signal comprising a predetermined number of digital words, each word representing the signal over a predetermined interval of time and containing a predetermined number of bits, each said data group comprising a predetermined number of digital words, each data group word containing enough bits to define a predetermined number X of different levels of data, each said sum comprising a predetermined number of digital words, each said sum word comprising the sum of one data group word and N signal words, and said fourth means including decoder means, located at an input to said third means, for decoding previous data group words and providing contribution to each sum word, and thus to each new data group word, such that more that one antenna scan is required before any data group word can change through more than a few of the X possible data levels.

6. In a radar system of the type which has an antenna which repetitively scans through M successive and substantially fixed antenna positions, produces at each said position during any one scan a predetermined number N of serially occurring RF energy transmissions, and converts the received RF signals into video signals, improved digital means for processing said video signals and comprising:

first means for converting a video signal into a digital format comprising a predetermined number of serially occurring digital words each representing the video signal over an associated one of adjacent range intervals, said first means including resettable holding means for ensuring, should the video amplitude exceed a predetermined amplitude at any time during a given range interval, that a digital indication of video signal presence is provided by said first means at the end of said given range interval, digital memory second means for retaining M groups of digitally formatted data, each data group being representative of previous reception from only a corresponding one of said M successive positions, digital summing third means, and fourth means, including timing control means, for (a) effecting the summing by said third means of (i) all N digitally formatted video signals occurring at a particular antenna position P during the most recent scan and (ii) data representative of the data group retained in said second means corresponding to antenna position P, and (b) causing a data group representative of the output sum of said third means to be entered into said second means at the location corresponding to antenna position P, thereby updating said second means by replacing a previous data group with a new data group, and (c) repeating said (a) and (b) for each of the other ones of the M positions, each said data group comprising a predetermined number of digital words, each data group word containing enough bits to define a predetermined number X of different levels of data, each said sum comprising a predetermined number of digital words, each said sum word comprising the sum of one data group word and N signal words, and said fourth means including decoder means, located at the input to said second means, for decoding each sum word into a data group word and serving as threshold detection means, outputting a particular one of said X data levels only for a particular range of values of the input sum word, at least one lower value data level being weighted more heavily than optimal toward low false alarm probability.

7. In a radar system of the type which has an antenna which repetitively scans through M successive and substantially fixed antenna positions, produces at each said positions during any one scan a predetermined number N of serially occurring RF energy transmissions, and converts the received RF signals into video signals, improved digital means for processing said video signals and comprising:

first means for converting a video signal into a digital format comprising a predetermined number of serially occurring digital words each representing the video signal over an associated one of adjacent range intervals, said first means including resettable holding means for ensuring, should the video amplitude exceed a predetermined amplitude at any time during a given range interval, that a digital indication of video signal presence is provided by said first means at the end of said given range interval, digital memory second means for retaining M groups of digitally formatted data, each data group being representative of previous reception from only a corresponding one of said M successive positions, digital summing third means, and fourth means, including timing control means, for (a) effecting the summing by said third means of (i) all N digitally formatted video signals occurring at a particular antenna position P during the most recent scan and (ii) data representative of the data group retained in said second means corresponding to antenna position P, and (b) causing a data group representative of the output sum of said third means to be entered into said second means at the location corresponding to antenna position P, thereby updating said second means by replacing a previous data group with a new data group, and (c) repeating said (a) and (b) for each of the other ones of the M positions, each said data group comprising a predetermined number of digital words, each data group word containing enough bits to define a predetermined number X of different levels of data, each said sum comprising a predetermined number of digital words, each said sum word comprising the sum of one data group word and N signal words, and said fourth means including decoder fifth means and decoder sixth means, said fifth means being located at the input to said second means, said sixth means being located at an input to said third means, said fifth means decoding each sum word into a data group word and serving as threshold detection means, outputting a particular one of said X data levels only for a particular range of values of the input sum word, at least one lower value data level being weighted more heavily than optimal toward low false alarm probability, said sixth means decoding previous data group words and providing contribution to each sum word, and thus to each new data group word, such that more than one antenna scan is required before any data group word can change through more than a few of the X possible data levels.

* * * * *

UNITED STATES PATENT AND TRADEMARK OFFICE
CERTIFICATE OF CORRECTION

PATENT NO. : 4,088,996
DATED : May 9, 1978
INVENTOR(S) : Marvin L. Hooker, Jr.

It is certified that error appears in the above-identified patent and that said Letters Patent are hereby corrected as shown below:

Column 5, line 57, delete "L" before the word "are".

IN THE CLAIMS

Column 10, line 26, delete "N" and substitute therefor --M--.

Column 10, delete lines 35 through 66.

Column 11, delete lines 1 through 3.

Column 14, line 42, delete "positions" and substitute therefor --position--.

Signed and Sealed this

Twenty-first Day of November 1978

[SEAL]

Attest:

RUTH C. MASON
Attesting Officer

DONALD W. BANNER
Commissioner of Patents and Trademarks